(12) United States Patent
Jain et al.

(10) Patent No.: US 11,379,250 B2
(45) Date of Patent: Jul. 5, 2022

(54) SELECTIVE APPLICATION AND DATA OFFLOADING

(71) Applicant: Dell Products L.P., Round Rock, TX (US)

(72) Inventors: Shailesh Jain, Bangalore (IN); Prashanth Devendrappa, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 503 days.

(21) Appl. No.: 16/438,181

(22) Filed: Jun. 11, 2019

(65) Prior Publication Data

US 2020/0394053 A1     Dec. 17, 2020

(51) Int. Cl.
    *G06F 9/445*       (2018.01)
    *G06F 8/65*        (2018.01)
    *G06F 8/61*        (2018.01)
    *H04L 67/50*      (2022.01)

(52) U.S. Cl.
    CPC ............ *G06F 9/44594* (2013.01); *G06F 8/61* (2013.01); *G06F 8/65* (2013.01); *H04L 67/535* (2022.05)

(58) Field of Classification Search
    CPC .......... G06F 9/44594; G06F 8/61; G06F 8/65; H04L 67/22
    See application file for complete search history.

(56) References Cited

U.S. PATENT DOCUMENTS

| | | | | |
|---|---|---|---|---|
| 2015/0339112 A1* | 11/2015 | Ryu | ...................... | G06F 11/324 717/174 |
| 2016/0063009 A1* | 3/2016 | Charania | ............... | G06F 16/162 707/693 |
| 2016/0357545 A1* | 12/2016 | Linn | ........................ | G06F 8/62 |
| 2018/0239555 A1* | 8/2018 | Cao | ........................ | G06F 3/0608 |

* cited by examiner

*Primary Examiner* — Kim Huynh
*Assistant Examiner* — Joshua Neveln
(74) *Attorney, Agent, or Firm* — Kirton McConkie; Brian Tucker

(57) ABSTRACT

Applications can be selectively offloaded to ensure that thin clients will have sufficient disk space to install an update. To enable this offloading, a service can be employed to track how long each application is used on the thin client during a particular time period. Based on this usage of each application, the service can assign a rank to each application. The service can also monitor the amount of free space on the disk to determine whether it has fallen below a threshold. If so, the service can employ the ranks to identify applications to be offloaded them by copying an install location folder for each application to a remote repository and then deleting each copied install location folder. When the thin client includes a write filter, the service can commit the deletes of the install location folders so that the applications will remain offloaded after reboot.

16 Claims, 16 Drawing Sheets

SELECTIVE APPLICATION AND DATA OFFLOADING

CROSS-REFERENCE TO RELATED APPLICATIONS

N/A

BACKGROUND

A thin client is a lightweight computing device that relies on a server to perform the majority of the processing for providing a desktop environment to the user. This lightweight design reduces costs and simplifies management. Yet, due to their lightweight design, thin clients have limited disk space compared to other types of devices such as desktops and laptops. It is therefore relatively common for thin clients to run out of disk space.

Many thin clients, such as Windows-based thin clients, employ a write filter which prevents the contents of the disk from being modified. In a typical example, it may be desirable to prevent the operating system image, which may be stored on a particular disk partition or on flash media, from being changed at runtime. To accomplish this, Windows provides the Unified Write Filter (UWF) to redirect all writes that target a protected volume to a RAM or disk cache called an overlay. This overlay stores changes made to the operating system at runtime but is removed when the device is restarted thereby restoring the device to its original state.

FIG. 1 illustrates how a write filter 110 can be employed to prevent the contents of a protected volume on disk 100 from being modified. Disk 100 is intended to generally represent any type of physical storage medium (or volume). In accordance with the Windows architecture, a driver stack consisting of file system driver 111, volume manager 112, and disk driver 113 sit atop disk 100, and I/O manager 120 manages the flow of I/O requests through the driver stack. An application (not shown) can employ file/directory management APIs 160 to invoke a service of system services 130 (e.g., by calling ReadFile, WriteFile, CreateFile, etc. on a particular file) which will result in I/O manager 120 creating an IRP for the request. This IRP will then be passed down through the driver stack.

As depicted in FIG. 1, write filter 110 is positioned at the top of the driver stack and will therefore be able to process an IRP prior to the IRP being passed down to the lower level drivers. Write filter 110 can be configured to detect writes targeting a protected volume and redirect them to overlay 140 rather than allowing them to be passed down the driver stack unchanged. As a result, the write will actually occur in overlay 140 rather than to disk 100. Write filter 110 can be further configured to detect reads that target content that was previously redirected to overlay 140 and redirect these reads to overlay 140. In this way, even though it will appear to the application that the content of disk 100 is being updated, the updates are actually being temporarily maintained in overlay 140. The contents of overlay 140 can be maintained until the operating system is restarted or until an explicit command is received to discard the contents of the overlay.

Thin clients are commonly used in an enterprise environment where minimizing the administrative burden is an important goal. Although the lightweight design of thin clients accomplishes this in most cases, it oftentimes complicates the process of installing updates. For example, an administrator will typically schedule an automatic deployment of an update to all thin clients in an enterprise environment. However, if a particular thin client is running low on disk space when the update is scheduled to be installed, the update will likely fail on that thin client. In this scenario, and given that many thin clients will have the same configuration, it is likely that the update will fail on many thin clients. The administrator will therefore need to manually create space for the update on each of these thin clients and then reschedule the update. This is a tedious and time consuming process. Additionally, if the thin clients employ a write filter, the process of creating space on the disk will likely include a number of reboots which would impact the users work unless the administrator performs the process outside business hours. Furthermore, if the update is a critical security update, the additional time that is required to create space on the disk for the update extends the thin client's vulnerability to the security risk.

BRIEF SUMMARY

The present invention extends to methods, systems, and computer program products for selectively offloading applications and data. This offloading can be performed to ensure that thin clients will have sufficient disk space to install an update when the update is deployed. As a result, the administrative burden relating to the installation of updates on thin clients can be greatly reduced.

To enable this offloading, an offloading and monitoring service can be employed to track how long each application is used on the thin client during a particular time period. Based on this usage of each application, the service can assign a rank to each application. The service can also monitor the amount of free space on the disk to determine whether it has fallen below a defined low disk threshold. If so, the service can employ the ranks to identify applications to be offloaded. The service can offload the applications by copying an install location folder for each application to a remote repository and then deleting each copied install location folder. When the thin client includes a write filter, the service can commit the deletes of the install location folders so that the applications will remain offloaded after reboot. Data files may also be offloaded in a similar manner.

In some embodiments, the present invention is implemented by a service that executes on a computing device as a method for selectively offloading applications from the computing device. The service can periodically monitor which application a user of the computing device is using. Based on the monitoring, the service can maintain a usage time of each of a plurality of applications that the user has used over a period of time. Each usage time represents how long the user has used the respective application during the period of time. The service can also detect that free space available on a disk of the computing device has fallen below a defined threshold. In response to the detection, the service can identify one or more of the plurality of applications to be offloaded based on the usage time maintained for the respective application. The service can then offload each of the one or more identified applications.

In other embodiments, the present invention is implemented as computer storage media storing computer executable instructions which when executed implement a method for selectively offloading applications from the computing device. This method includes: periodically monitoring which application a user of the computing device is using; based on the monitoring, maintaining a usage time of each of a plurality of non-critical applications that the user has used over a period of time, each usage time representing how long the user has used the respective non-critical application during the period of time; assigning a rank to each of the plurality of non-critical applications based on the usage time of the respective application; detecting that free space available on a disk of the computing device has fallen below a defined threshold; in response to the detection, identifying a first application of the plurality of non-critical applications that has been assigned a highest rank; and offloading the first application by causing a copy of an install location folder of the first application to be stored in a remote repository and causing the install location folder to be deleted from the disk.

In other embodiments, the present invention is implemented by a service that executes on a thin client that includes a write filter as a method for selectively offloading applications from the thin client. The service periodically monitors which application a user of the thin client is using. Based on the monitoring, the service maintains a usage time of each of a plurality of applications that the user has used over a period of time, each usage time representing how long the user has used the respective application during the period of time. The service detects that free space available on a disk of the thin client has fallen below a defined threshold. In response to the detection, the service identifies one or more of the plurality of applications to be offloaded based on the usage time maintained for the respective application. Each of the one or more identified applications is a non-critical application. The service then offloads each of the one or more identified applications by: causing a copy of an install location folder for the respective application to be stored on a remote repository; deleting the install location folder for the respective application; and invoking commit functionality of the write filter to cause the install location folder for the respective application to be deleted from the disk.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "computing device" should be construed as encompassing desktops, laptops, tablets, smart phones, thin clients, etc. The term "thin client" should be given its customary meaning—i.e., a lightweight computing device that relies on a server to perform the majority of the processing for providing a desktop environment to the user. The present invention is particularly beneficial for thin clients due to their minimal disk space but could be implemented on any computing device.

The present invention can be implemented on computing devices running operating systems that provide a write filter. The term "write filter" should be construed as a component of the I/O system that prevents the content of a disk (or protected volume) from being modified by redirecting I/O requests to an overlay. The Unified Write Filter (UWF) of the Windows operating system is one example of a write filter. However, the present invention is not limited to implementation in Windows environments and can be implemented with other operating systems that provide a write filter. Additionally, the present invention can be implemented when a write filter is not employed.

Figure 2:
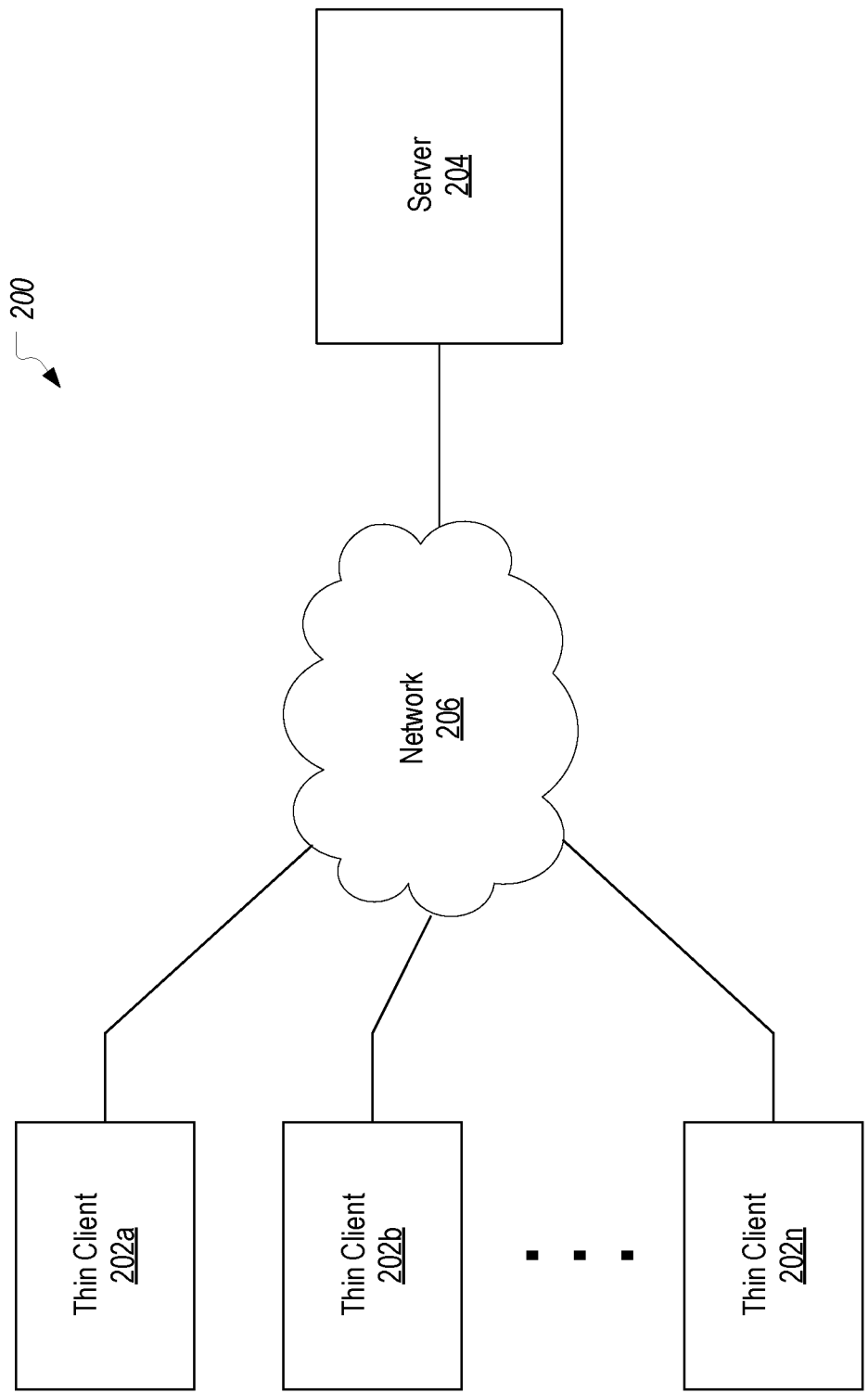
FIG. 2 illustrates an example computing environment in which the present invention can be implemented.

FIG. 2 illustrates one example computing environment 200 in which the present invention can be implemented. Computing environment 200 represents an enterprise environment in which a number of thin clients 202a-202n (where n represents any integer) are connected to a server 204 via a network 206. In typical scenarios, each of thin clients 202a-202n (or generally thin client(s) 202) will include a remote display protocol client by which the thin client establishes a remote session on server 204. In this way, many, if not most, of the applications that the users of thin clients 202 will employ can be hosted on server 204. As described in the background, this enables thin clients 202 to be lightweight, and, of importance to the present invention, to require a relatively small disk.

Figure 1:
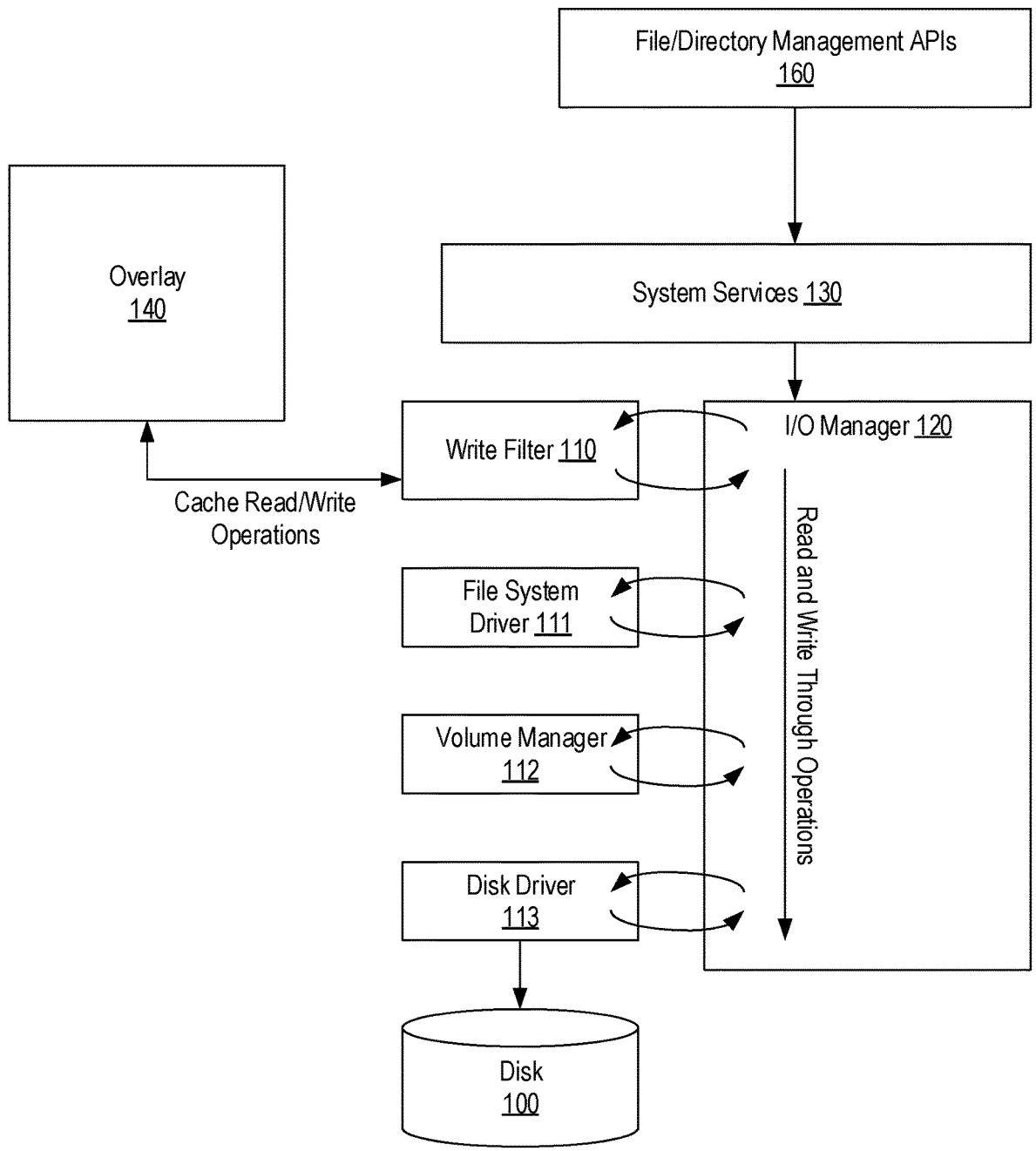
FIG. 1 illustrates how a write filter is employed in a Windows I/O system.
Figure 3A:
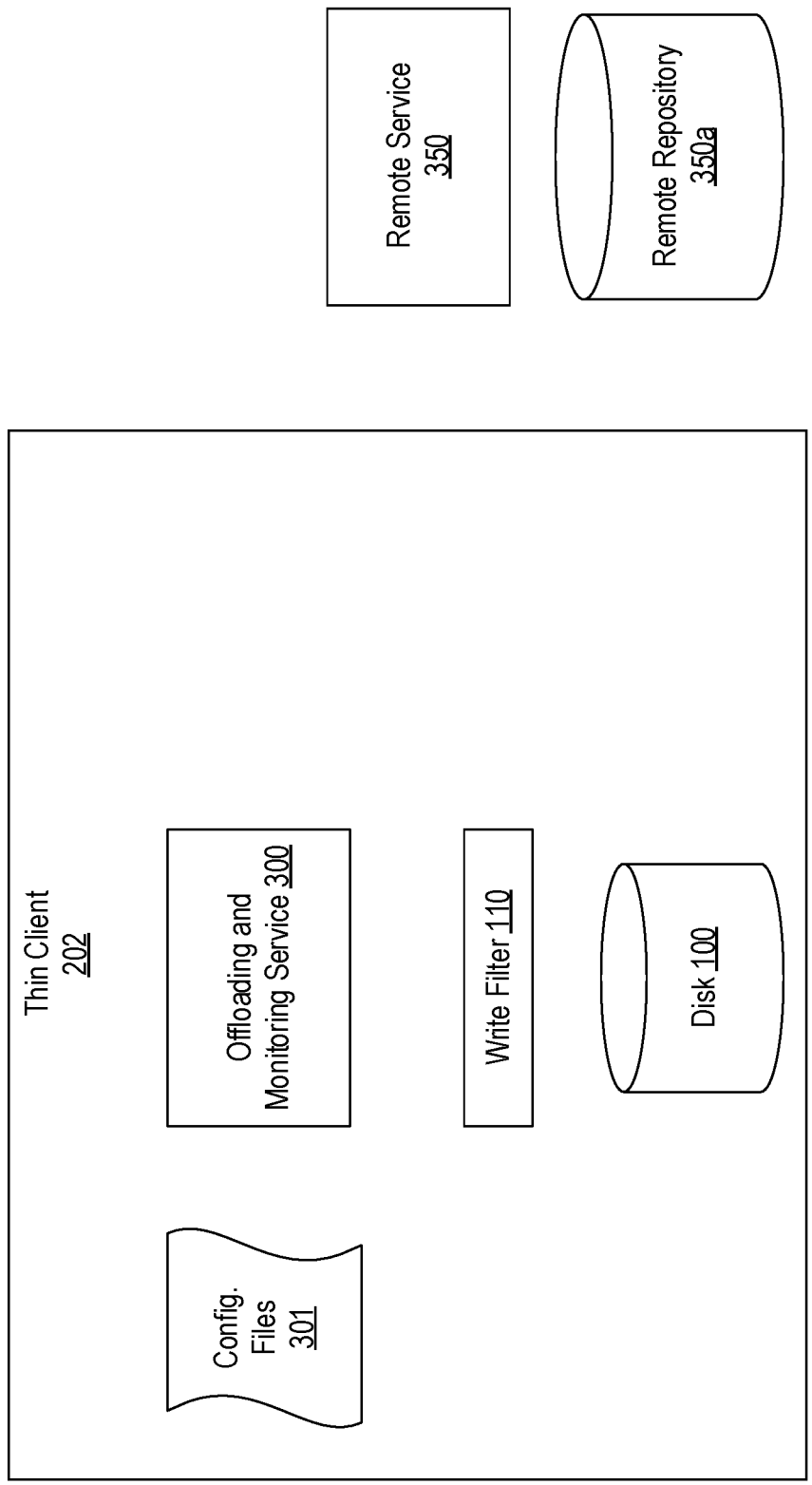
FIGS. 3A and 3B each illustrate an example of components that may be employed to implement embodiments of the present invention.

FIG. 3A illustrates an example of some of the components that may exist on thin client 202 to enable the present invention to be implemented. As shown, thin client 202 includes a disk 100 which would store the operating system image and typically a relatively small number of applications (e.g., a remote display protocol client, a browser, a PDF viewer, etc.). It is assumed that the operating system provides a write filter 110, and therefore, thin client 202 could implement an I/O system architecture similar to what is shown in FIG. 1. Thin client 202 also includes an offloading and monitoring service (or simply "service") 300 that is configured to perform the techniques of the present invention. Service 300 can maintain and access configuration files 301 for this purpose as will be described below. FIG. 3A also shows that a remote repository 350a can be employed to store applications and data files that service 300 causes to be offloaded from thin client 202. In some embodiments, a remote service 350 can be provided to enable service 300 to access remote repository 350a (e.g., when the remote repository is cloud-based storage). In other embodiments, however, remote repository 350a may be network storage that service 300 can directly access.

Figure 3B:
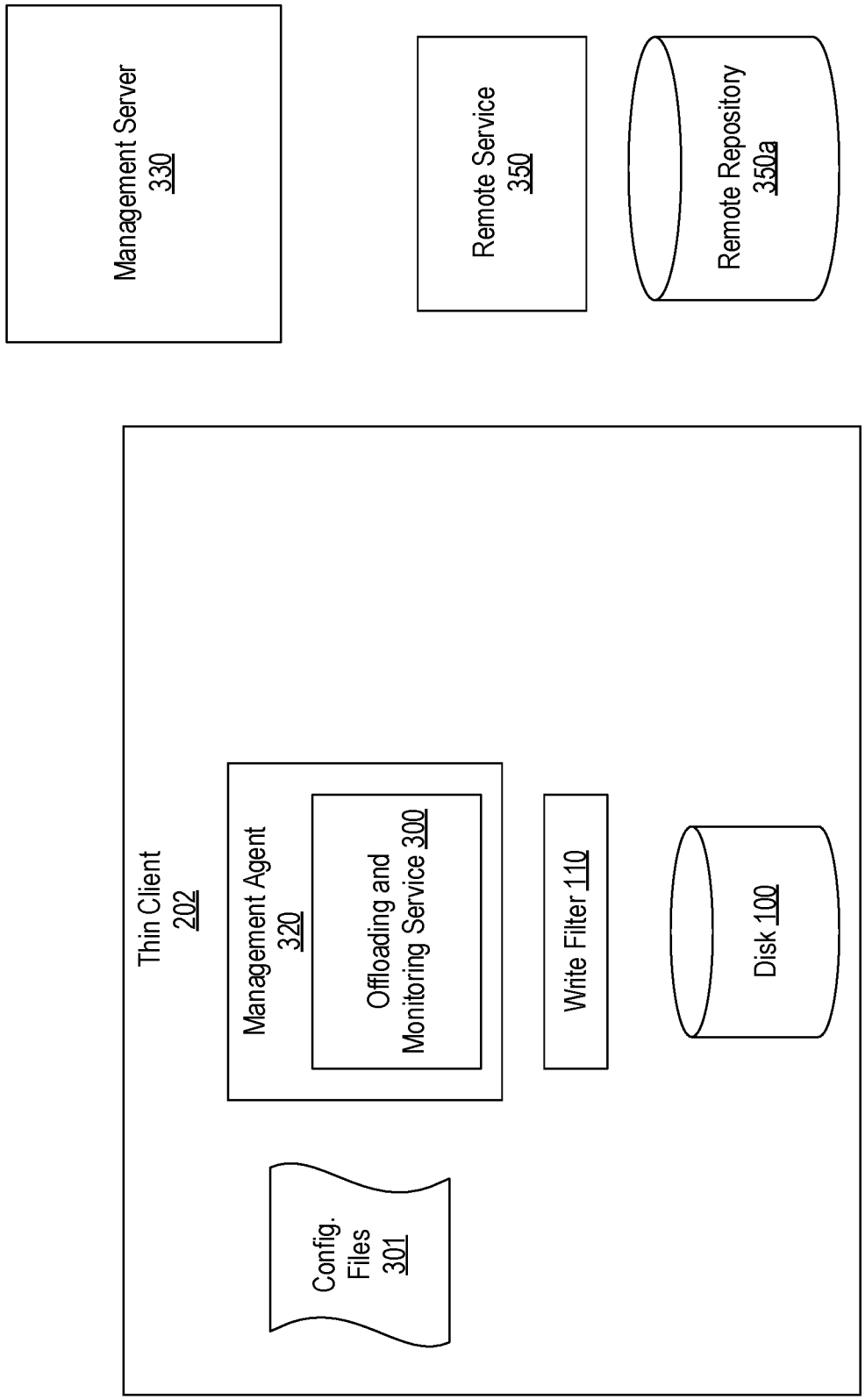

In some embodiments, service 300 can provide a local user interface by which an administrator can configure the service locally. In other embodiments, service 300 can be a component of a management agent 320 as shown in FIG. 3B. In such cases, management agent 320 can be configured to interface with a management server 330 to thereby allow an administrator to configure service 300 remotely using management server 330. In either case, service 300 can receive configuration information from an administrator and store the information in configuration files 301.

FIGS. 4A-4D and 5A-5F illustrate the process by which service 300 can offload applications to ensure that there will be sufficient space on disk 100 when an update needs to be installed. FIGS. 4A-4D represent how service 300 can track utilization of non-critical applications while FIGS. 5A-5F represent how service 300 can offload non-critical applications based on the tracked utilization. FIG. 6 is intended to represent that service 300 can perform a similar process to offload data files.

Figure 4A:
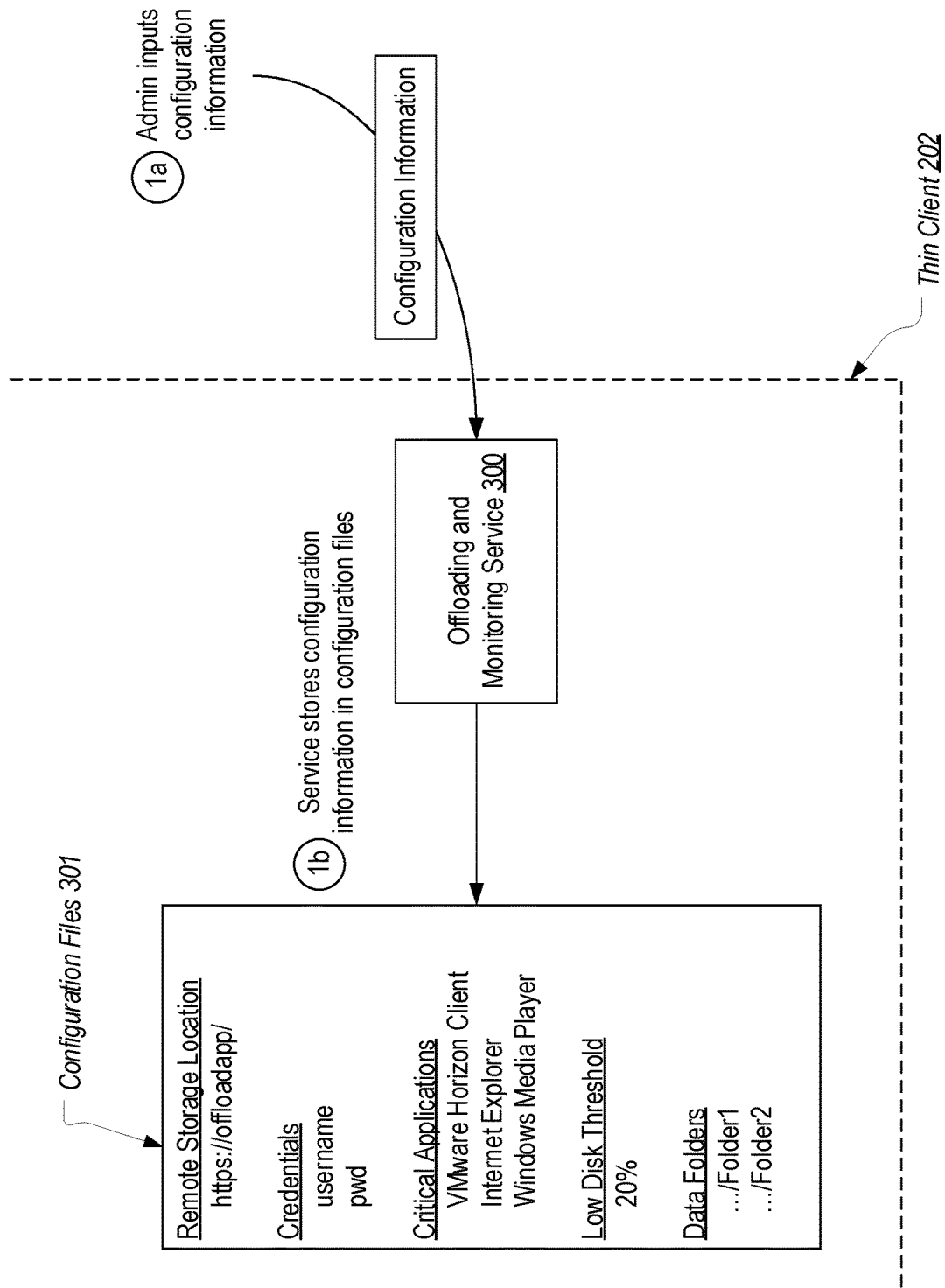
FIGS. 4A-4D illustrate how a service can monitor which applications a user is using and track an active duration of the applications.

In FIG. 4A, an administrator is represented in step 1a as providing input of configuration information. The administrator could do so by interacting directly with an interface that service 300 provides locally or by employing management server 330. In either case, the administrator can specify various types of configuration information including a remote storage location defining where service 300 should offload applications and possibly data files (which could identify a remote service 350 and/or a location on remote repository 350a), credentials for accessing the remote storage location, a list of critical applications which service 300 should not offload, a low disk threshold that defines when service 300 should commence offloading applications and any data folders that service 300 could examine to identify data files to offload.

In response to receiving this configuration information, and in step 1b, service 300 can write the configuration information to configuration files 301. In this example, it will be assumed that the remote storage location (or remote service 350) is https://offloadapp/, that VMware Horizon Client, Internet Explorer and Windows Media Player have been identified as critical applications, that the low disk threshold is 20% and that two data folders, . . . /Folder1 and . . . /Folder2, have been identified as folders that service 300 may examine to identify data files that could be offloaded.

Configuration files 301 can preferably be stored on disk 100 in a manner that allows service 300 to persistently modify the files (e.g., by adding configuration files 301 or a folder they are stored in to an exclusion list). This will ensure that the configuration information will be persisted across reboots. Alternatively, service 300 could be configured to retrieve the configuration information at each reboot (e.g., by querying management server 330 for the configuration information applicable to the particular thin client). In such cases, configuration files 301 could be created and temporarily stored in the write filter's overlay.

With the configuration information stored in configuration files 301, service 300 can commence monitoring application and disk utilization to determine whether any applications should be offloaded. As a service, service 300 can run continuously so that it can periodically detect which application the user is using and how much space is available on disk 100. In some embodiments, service 300 can detect which application the user is using and the amount of free space on disk 100 at the same periodic interval. In other embodiments, service 300 may detect the amount of free space on disk 100 at a less frequent interval.

Figure 4B:
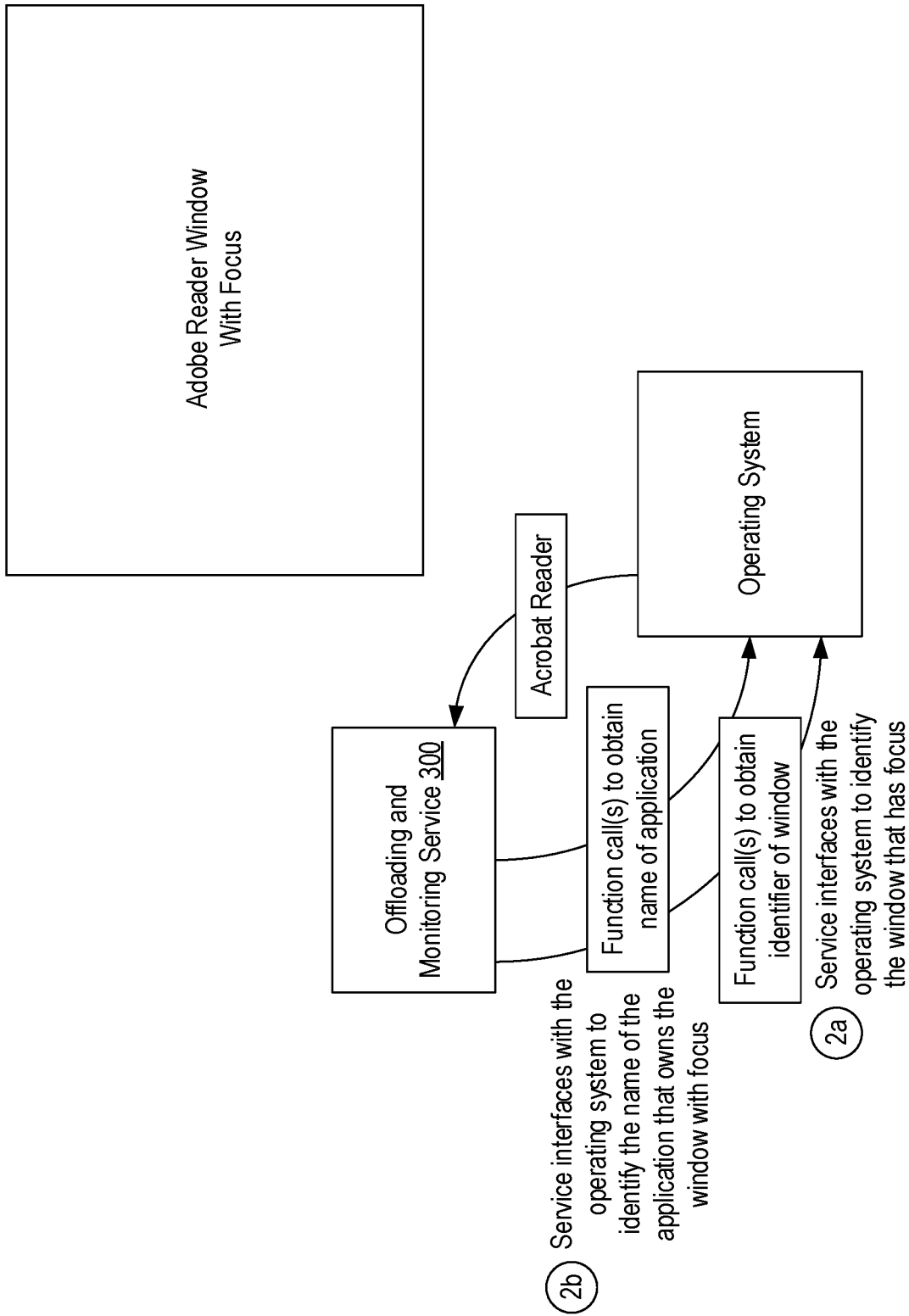

FIG. 4B represents how service 300 can periodically detect (e.g., every 5 seconds) which application the user is currently using (or the "active application"). For purposes of this example, it will be assumed that the user is currently using Acrobat Reader. In step 2a, service 300 interfaces with the operating system to identify which window has focus. For example, service 300 can be configured to obtain a handle to (or identifier of) the window that currently has focus (e.g., by calling the GetForegroundWindow function in Windows or the XGetInputFocus function in Linux) at the specified interval (e.g., every 5 seconds). Then, in step 2b, service 300 can interface with the operating system to identify the name of the application that owns the window that currently has focus. For example, service 300 can accomplish this is by calling the GetWindowThreadProcessId function using the handle to the window that it retrieved in step 2a to obtain the identifier of the thread that created the window, opening a handle to the thread (e.g., by calling the OpenProcess function), and then calling the GetModuleFileNameEx function using the handle to the thread to retrieve the application name. As shown, this process will result in the operating system providing service 300 with "Acrobat Reader" as the name of the application that owns the window that currently has focus. This process can be repeated periodically so that service 300 will obtain the name of the active application at each interval.

Figure 4C:
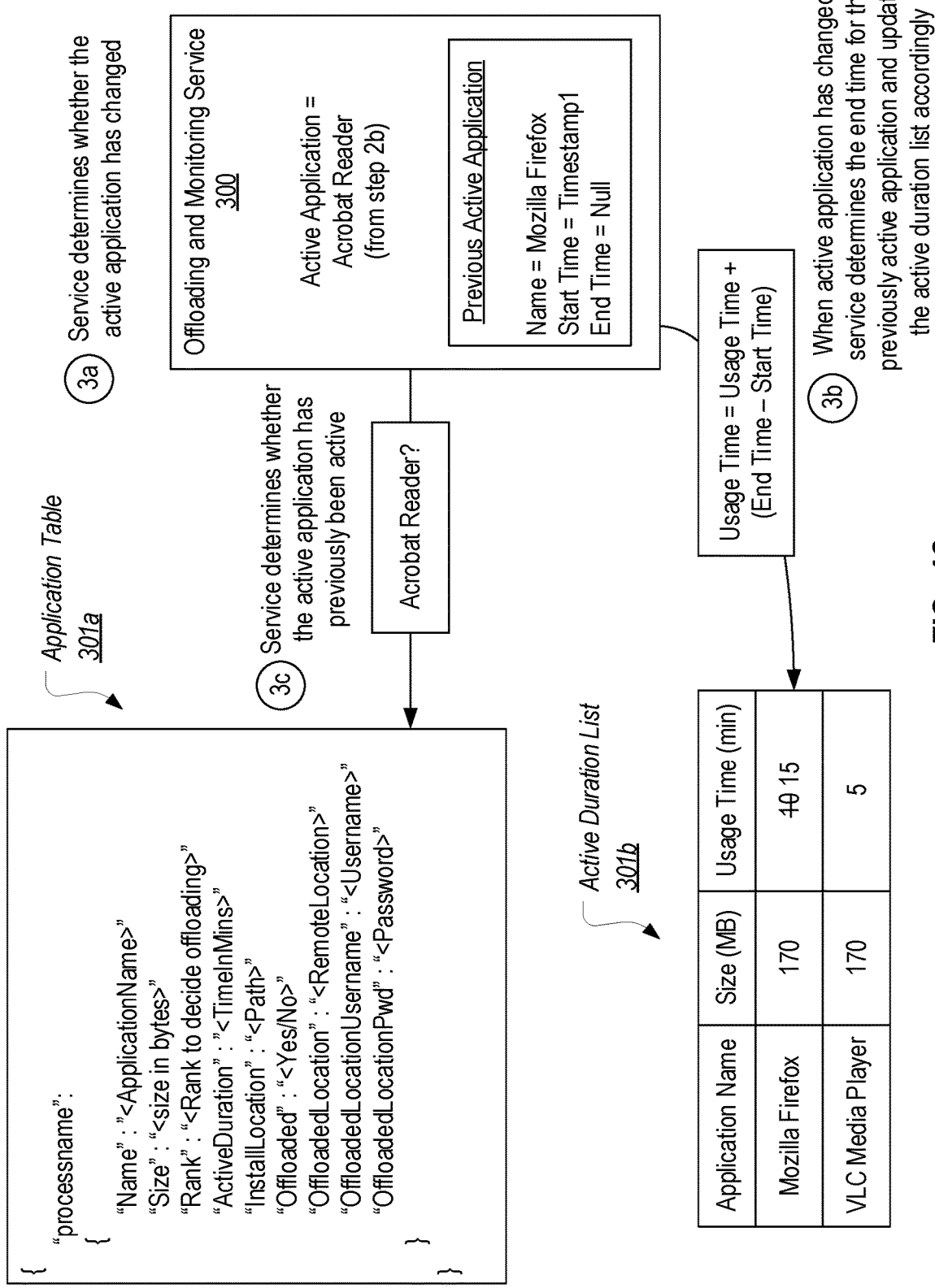

FIG. 4C illustrates the functionality that service 300 can perform when it determines the name of the active application. As is shown, service 300 can maintain an application table 301a and an active duration list 301b as part of configuration files 301. Application table 301a includes an entry for each application that service 300 has previously identified as the active application. For example, application table 301a can initially be empty when service 300 is first configured but can be populated as service 300 detects new active applications. In FIG. 4C, application table 301a is represented in the form of a JSON template showing that each entry can identify a number of different values for the corresponding application including the name of the application, its size, an assigned rank (as will be described below), an active duration, an install location, whether the application has been offloaded, the remote location where the application was offloaded, and a username and password for accessing the remote location among possibly other values.

The primary purpose of application table 301a is to facilitate the identification of applications that should be offloaded when disk space falls below the low disk threshold. Therefore, application table 301a need not include an entry for any application that is identified as a critical application in configuration files 301.

Active duration list 301b can include an entry for each entry in application table 301a (i.e., an entry for each application that has been the active application). The entries in active duration list 301b can identify the name of the application, its size and its usage time. Active duration list 301b is therefore a subset of the information contained in application table 301a which service 300 can use to simplify the process of identifying which application to offload as will be described below.

FIG. 4C also shows that service 300 can store the name of the active application, the start time (i.e., when the active application became active) and an end time (which can be null until the active application is no longer active). Service 300 can maintain this information during the periodic process shown in FIG. 4B so that it can determine when an application becomes active and how long the application remains active. In particular, as represented in step 3a, at each interval after service 300 has retrieved the name of the active application, it can determine whether the active application has changed from the previous interval (by comparing the name of the application that it has just received to the name that it had previously stored). If the active application has not changed, service 300 can simply wait until the next interval to perform the same determination.

In contrast, if the active application has changed (which is the case in the example shown in FIG. 4C since the active application is Acrobat Reader but service 300 has stored Mozilla Firefox as the name of the previously active application), service 300 can identify the end time for the previously active application (Mozilla Firefox) and the start time for the currently active application (Acrobat Reader). These start and end times can be the current system time. In step 3b, service 300 can use the start and end times for the no-longer-active application to update active duration list 301b accordingly. For example, assuming Mozilla Firefox had a previous usage time of ten minutes and was just used for another five minutes, service 300 could update the usage time value from 10 to 15 as shown. In this way, service 300 can maintain a running total of the usage time of each application.

In addition to updating the usage time for the previously active application, in step 3c, service 300 can also determine whether the currently active application has previously been active. In other words, service 300 can determine whether an entry exists for the active application in application table 301a and/or active duration list 301b. If an entry does not exist, service 300 can determine that this is the first time that the active application has been active and can create an entry for the application.

Figure 4D:
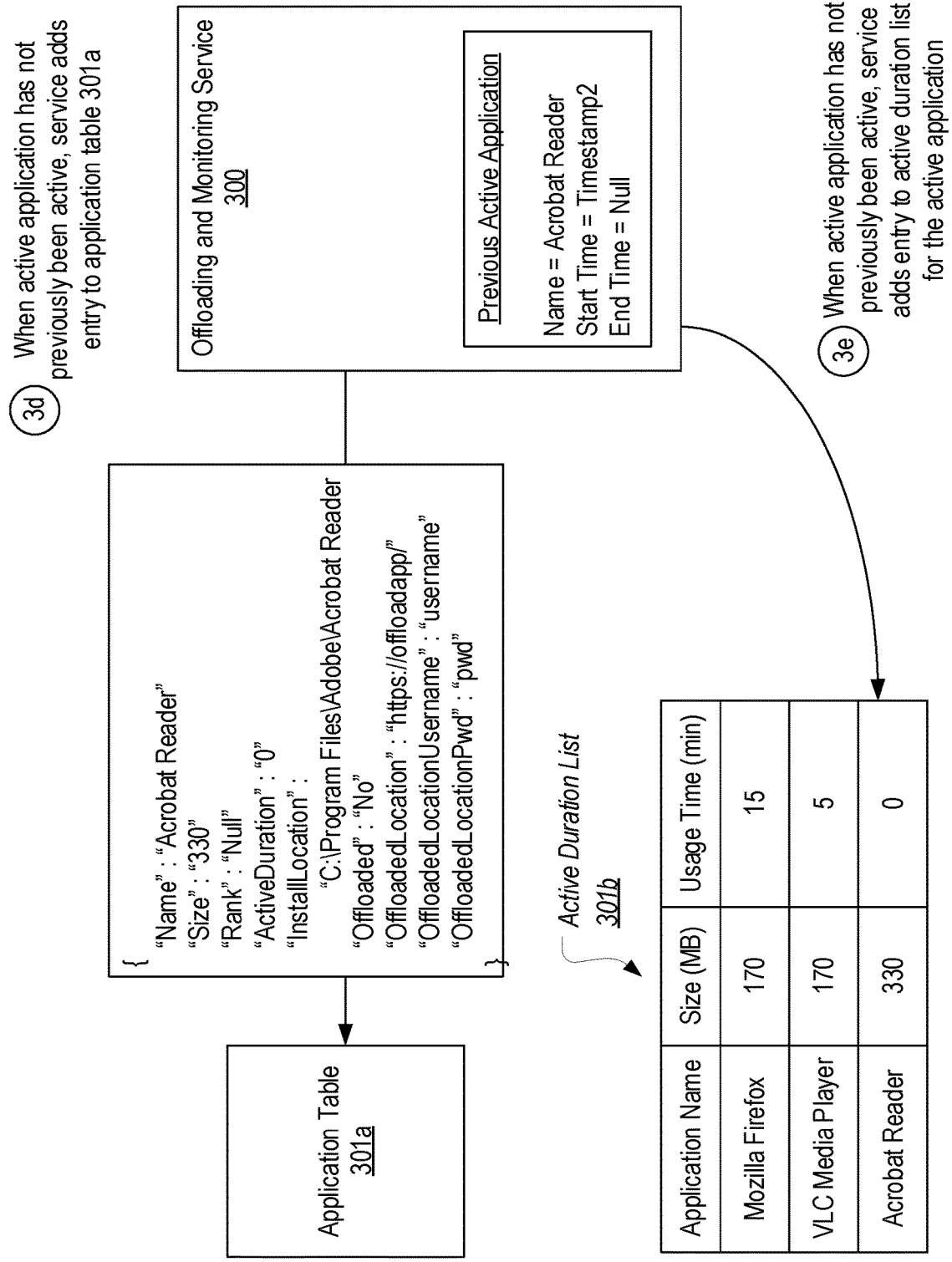

In step 3d shown in FIG. 4D, service 300 is represented as adding an entry for Acrobat Reader to application table 301a. As shown, this entry includes the name which would have been obtained in step 2b, the size of the application and the install location. In Windows embodiments, service 300 can obtain the path for the "InstallLocation" parameter by accessing the registry to find the key for Acrobat Reader under HKEY_LOCAL_MACHINE\SOFTWARE\Microsoft\Windows\CurrentVersion\Uninstall and then extracting the value of the key's InstallLocation string. This value identifies the folder where the application's executable files are stored. In non-Windows embodiments, service 300 could search the file system for this folder. Once this folder is identified, service 300 can obtain the size of the folder and use this size for the entry being added to application table 301a. In the example, it is assumed that Acrobat Reader is installed at C:\Program Files\Adobe\Acrobat Reader and that this folder has a size of 330 MB. The OffloadedLocation, OffloadedLocationUsername and OffloadedLocationPwd values can be populated using the information in configuration files 301. The Rank and ActiveDuration values can initially be set to null.

In step 3e, service 300 adds an entry to active duration list 301b for Acrobat Reader. As shown, this entry can include the size of Acrobat Reader and the usage time which is assumed to be 0 minutes at this point. It is noted that the use of an active duration list 301b that is separate from application table 301a is an optional feature. In some embodiments, service 300 may employ only application table 301a. However, as will be described in more detail below, the use of a separate active duration list 301b facilitates identifying the rank for each application in application table 301a.

To summarize what is shown in FIGS. 4A-4D, service 300 can repeatedly identify the active application. If the active application has changed, service 300 can update the usage time for the previously active application and can commence monitoring the usage time of the currently active application. If the currently active application has not previously been active, service 300 can also compile information for the active application to create entries in application table 301a and active duration list 301b.

Although not mentioned in the description above, it is to be understood that service 300 can forego steps 3b-3e when the previously active application is a critical application. In particular, service 300 can still track when a critical application is the active application. However, when the critical application is no longer the active application, service 300 need not add or update an entry in application table 301a or active duration list 301b. Therefore, by identifying an application as a critical application, the administrator can ensure that service 300 will not offload the application.

While service 300 repeatedly performs the steps shown in FIGS. 4B-4D, it can also periodically monitor the amount of free space on disk 100. For example, in step 1a shown in FIG. 5A, service 300 can query the operating system to determine the amount of free space on disk 100. For example, service 300 could call the GetDiskFreeSpaceEx function in Windows environments or the statvfs function in Linux environments to determine the current amount of free space on disk 100. In step 1b, service 300 can compare the amount of free space on disk 100 to the low disk threshold defined in configuration files 301. In the depicted example, it is assumed that 19% of the disk is free space which is below the low disk threshold of 20%. As a result, service 300 can initiate the process of offloading one or more applications.

Figure 5A:
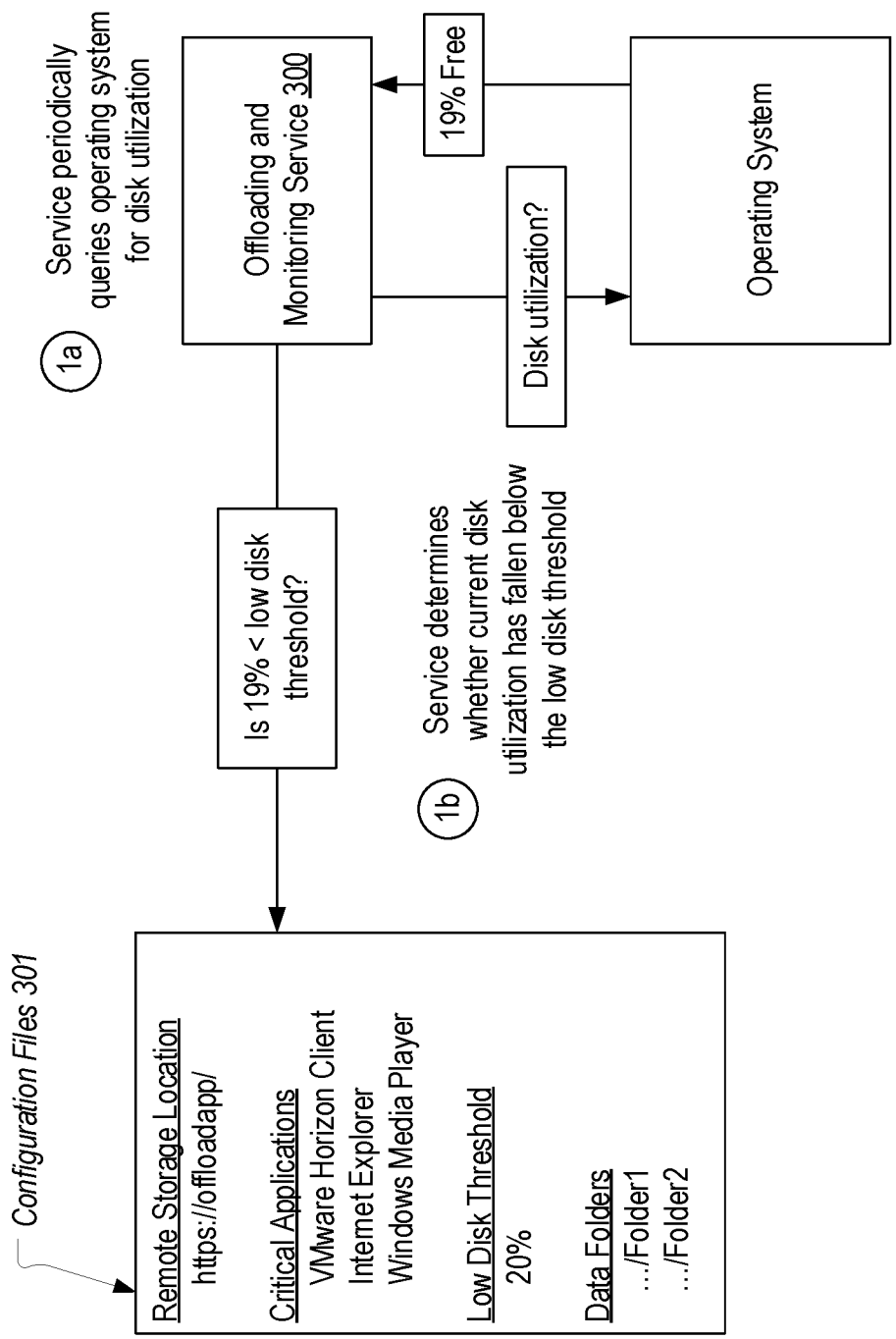
FIGS. 5A-5F illustrate how the service can detect when the amount of free space on a disk has fallen below a defined threshold and in response, identify and offload applications.
Figure 5B:
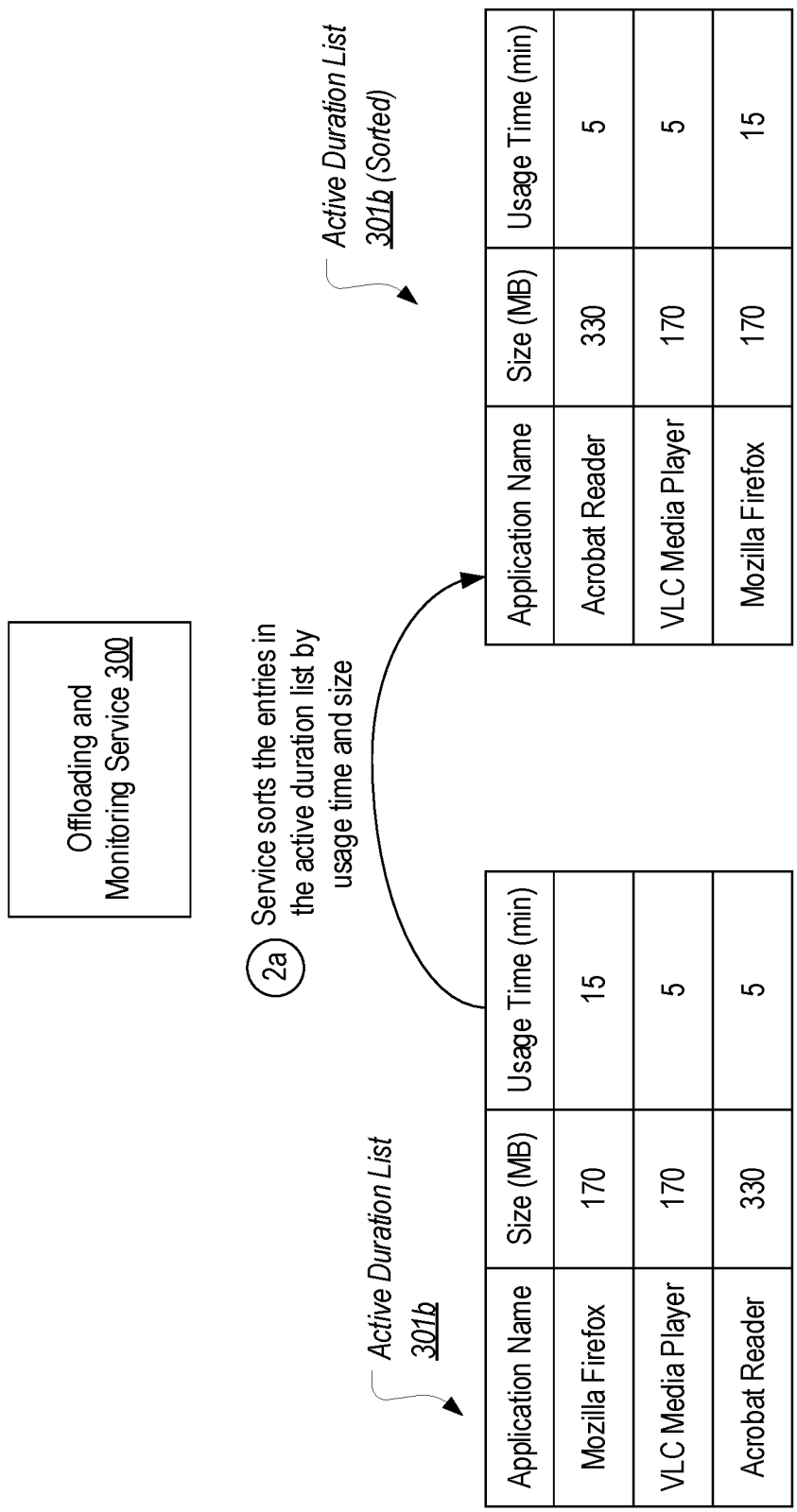
Figure 6:
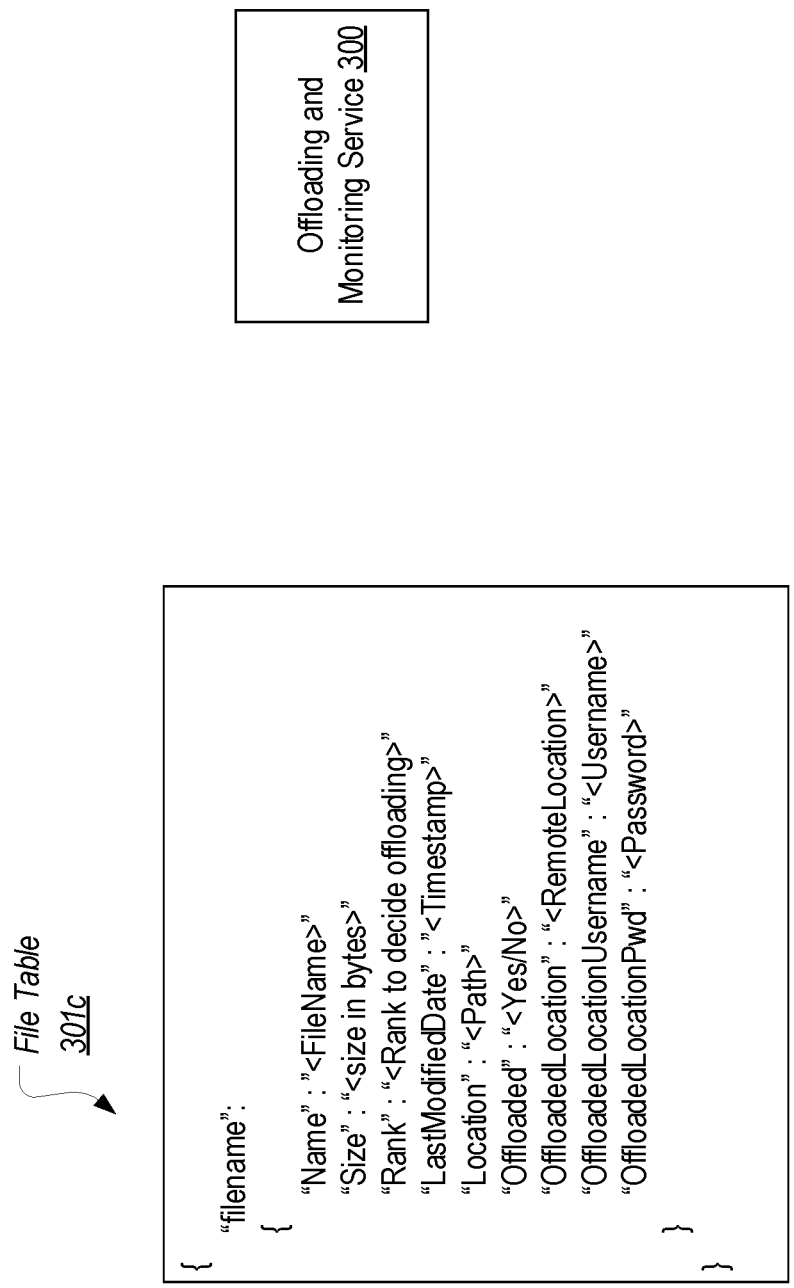
FIG. 6 represents that the service can perform a similar process to offload data files.

Turning to FIG. 5B, it will be assumed that, as a result of the process depicted in FIGS. 4B-4D, service 300 has updated active duration list 301b so that the usage times for Mozilla Firefox, VLC Media Player and Acrobat Reader are 15, 5 and 5 respectively at the time when the amount of free space on disk 100 falls below the low disk threshold. As represented in step 2a, to determine which application(s) to offload, service 300 can first access active duration list 301b to sort the list by usage time (lowest to highest) and, if necessary, by size (largest to smallest). In the example, Acrobat Reader and VLC Media Player have the same lowest usage time and will therefore appear at the top of the sorted list. Then, these two entries can be sorted based on size resulting in Acrobat Reader being placed at the top of the sorted list. As can be seen, this sorting identifies which applications are used the least.

Figure 5C:
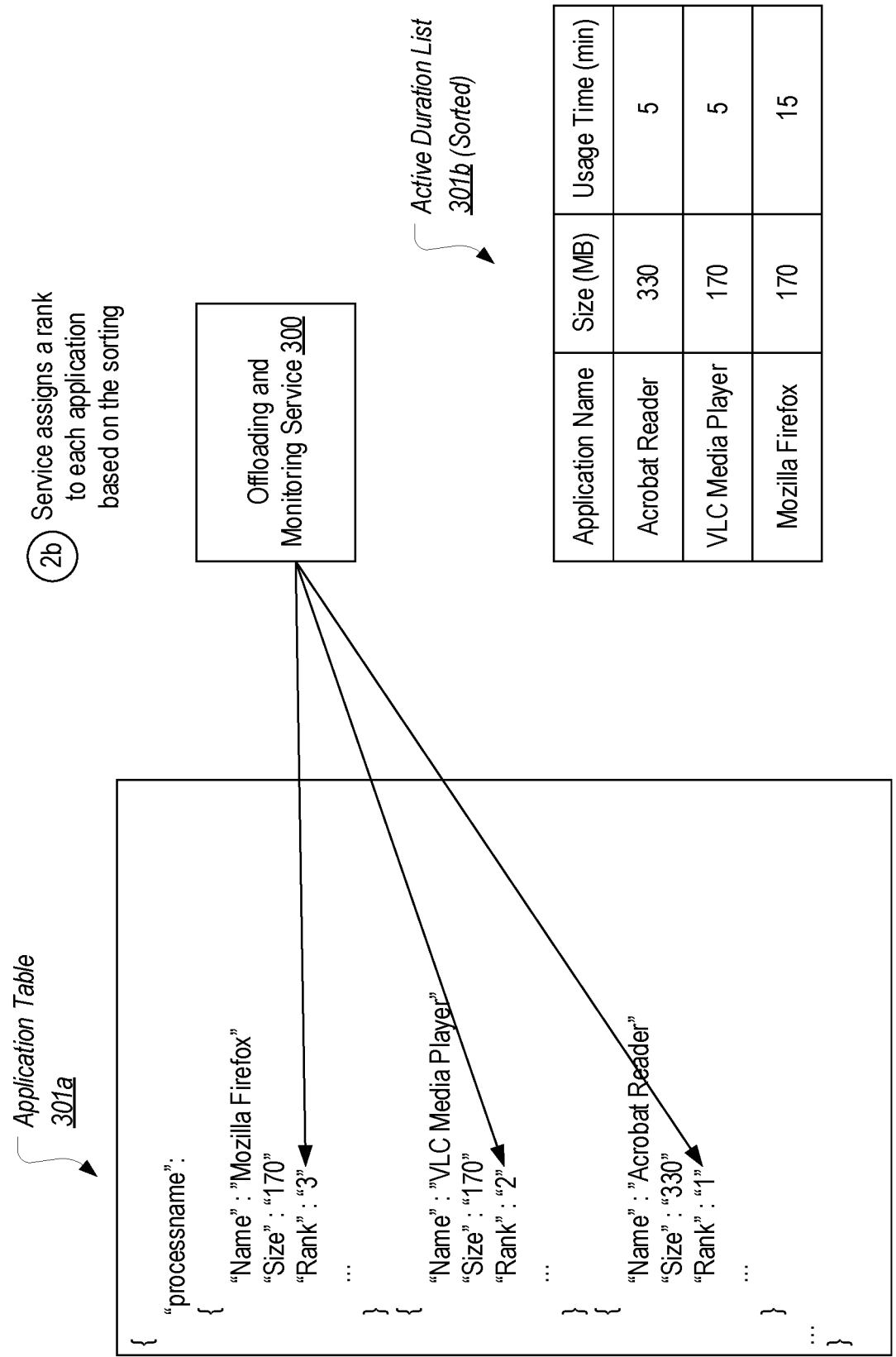

In step 2b shown in FIG. 5C, service 300 can employ the sorted version of active duration list 301b to populate the rank field of each application's entry in application table 301a. In this example, service 300 can set the rank field for the Acrobat Reader entry to 1 to indicate that it is the top candidate for offloading based on its usage time and its size. Similarly, service 300 can set the rank fields for the VLC Media Player and Mozilla Firefox entries to 2 and 3 respectively.

In the example, it is assumed that the rank fields were not previously set. However, it is equally possible that the rank field for at least some of the entries may have previously been set (e.g., when service 300 previously performed steps 2a and 2b). Also, the steps of sorting active duration list 301b and updating the rank fields in application table 301a may be performed at times other than in response to the amount of free space on disk 100 falling below the low disk threshold. For example, service 300 could be configured to periodically (e.g., hourly or daily) sort active duration list 301b and update the rank fields accordingly.

Figure 5D:
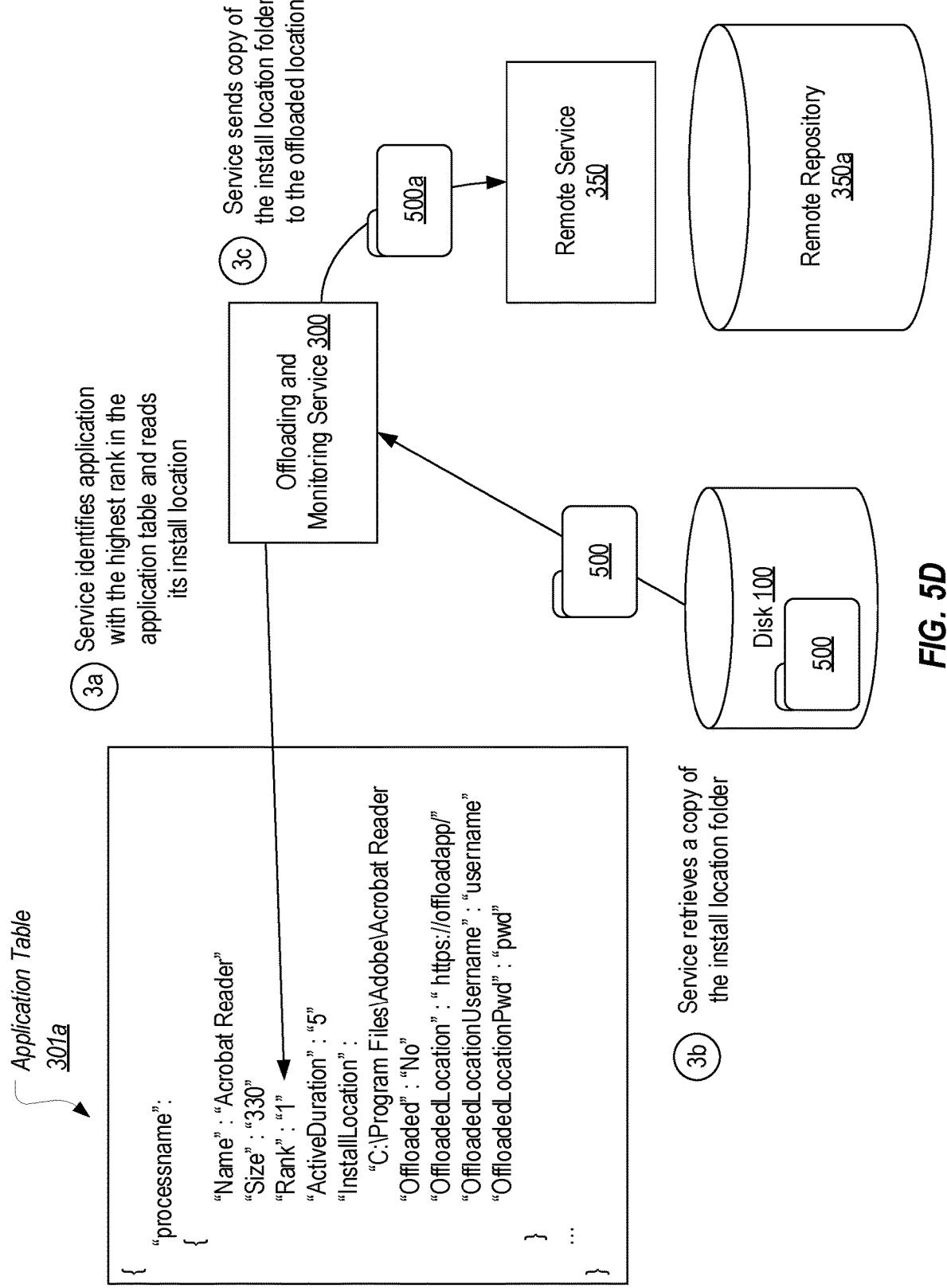
Figure 5E:
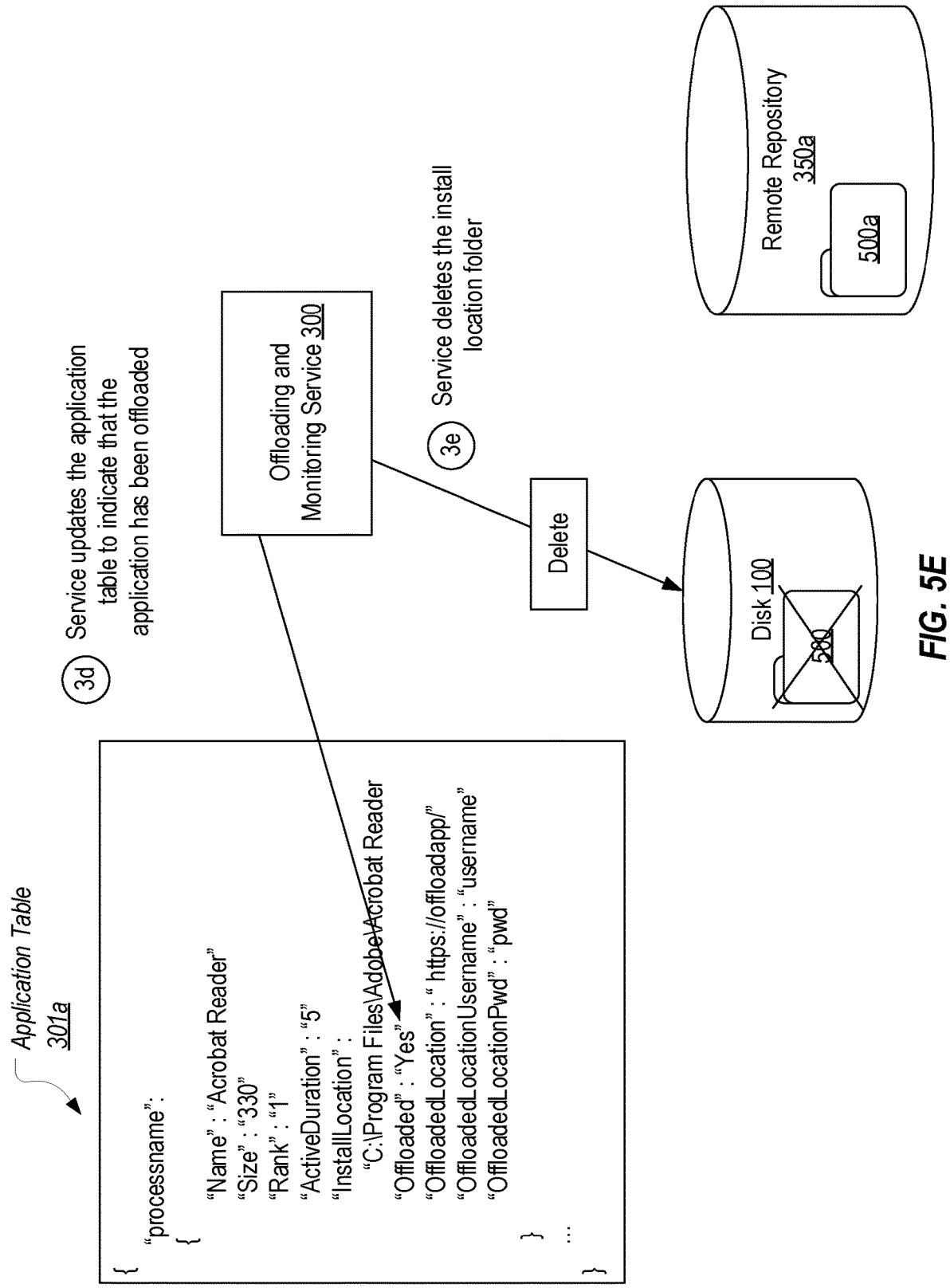

FIGS. 5D and 5E illustrate how service 300 can identify and offload an application based on the ranks defined in application table 301a. In step 3a, service 300 can access application table 301a to identify which application has been assigned the highest rank. In this example, service 300 will identify the entry for Acrobat Reader. Additionally, service 300 can read the value of the InstallLocation field in the identified entry which in this example is "C:\Program Files\Adobe\Acrobat Reader."

In step 3b, service 300 can employ the value of the InstallLocation field (i.e., the "install location folder") to retrieve a copy of the install location folder 500 from disk 100. Then, in step 3c, service 300 can send a copy of the install location folder 500 to the remote storage location (or remote service 350) identified in configuration files 301 which is https://offloadapp/ in this example. As represented in FIG. 5D, service 300 may compress install location folder 500 to create a compressed file 500a (e.g., a .zip file) and may then send the compressed file 500a to remote service 350.

In the depicted embodiment, remote service 350 can receive the compressed file 500a and employ information about thin client 202 (which service 300 may include in the communication) to store the compressed file 500a at a particular location in remote repository 350a. For example, remote service 350 can create/maintain a folder in remote repository 350a that is named with the name of the particular thin client 202 on which service 300 is executing and may store all offloaded content that it receives from thin client 202 in this folder. In embodiments, where remote repository 350a is directly accessible to service 300, service 300 may directly store compressed file 500a (or possibly folder 500) in the defined location in remote repository 350a.

Turning to FIG. 5E, with install location folder 500 offloaded to remote repository 350a, in step 3d, service 300 can update application table 301a by setting the Offloaded field for Acrobat Reader to Yes. Also, in step 3e, service 300 can delete the install location folder 500 from disk 100. In embodiments that employ write filter 110, step 3e can include deleting the folder (which, due to the write filter, will cause the deletion to be reflected in the overlay while the folder remains on disk 100) and then committing the deletion to disk 100 (which will cause the folder to be deleted from disk 100). Without committing the delete, the offloaded application would reappear after reboot.

Figure 5F:
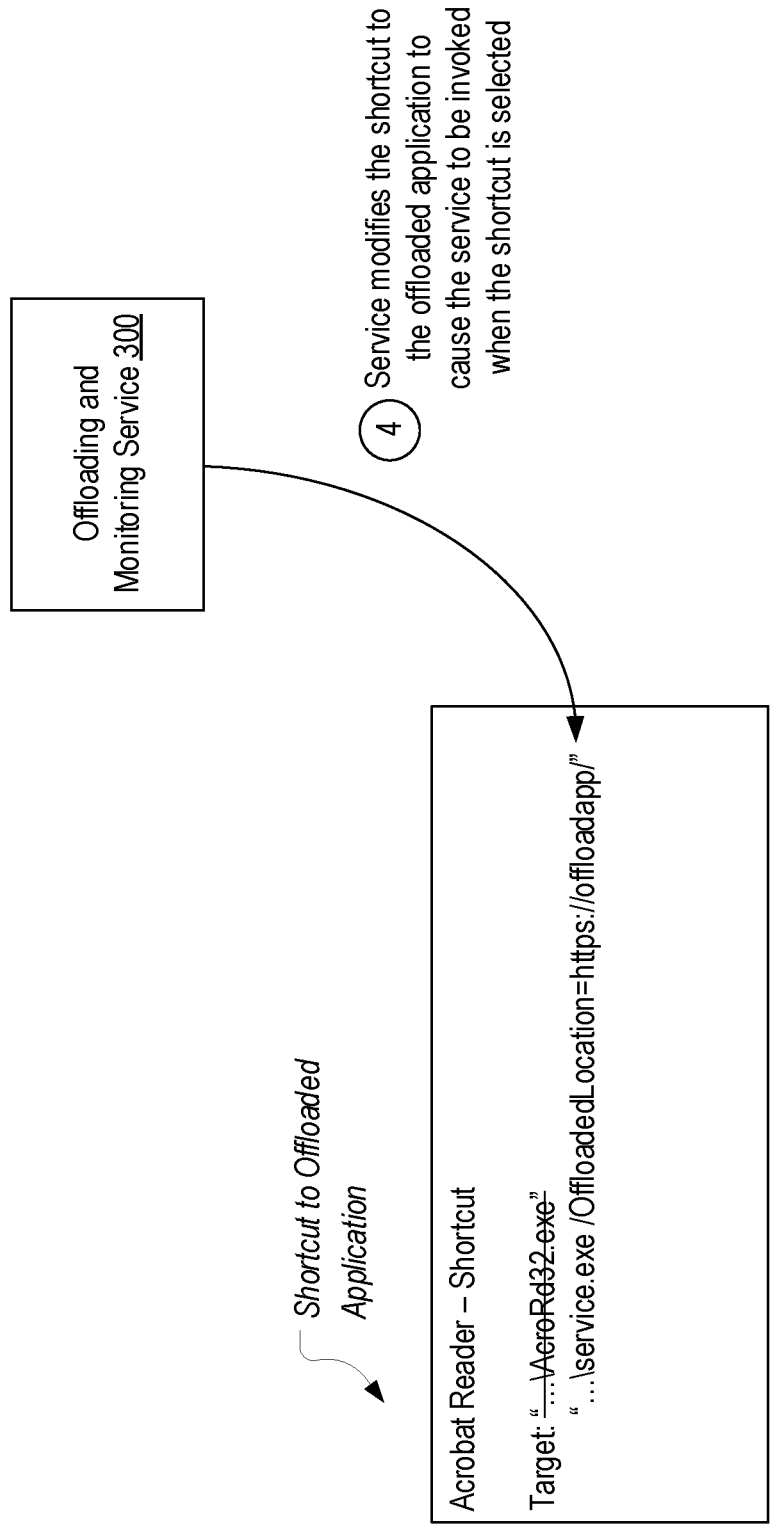

Finally, in step 4 shown in FIG. 5F, service 300 can modify any shortcut to the offloaded application so that the selection of the shortcut will invoke service 300 rather than the now-offloaded application. For example, FIG. 5F shows that service 300 can modify the target of the Acrobat Reader shortcut so that it points to service 300's executable ( . . . \service.exe) and identifies the remote storage location as a command line argument (/OffloadedLocation=https:// offloadapp/) as opposed to pointing to Acrobat Reader's executable ( . . . \AcroRd32.exe). Service 300 may also cause service 300 to be the default application for any file types that are associated with Acrobat Reader (e.g., .pdf) so that service 300 is invoked when these file types are invoked.

Service 300 can perform this process to offload as many applications as may be necessary to cause the amount of free space on disk 100 to no longer fall below the low disk threshold. For example, if offloading Acrobat Reader does not free up sufficient space on disk 100, service 300 may also offload VLC Media Player and possibly Mozilla Firefox to free up an additional 340 MB. Service 300 may employ the values of the size fields in application table 301a to determine how many applications should be offloaded to bring the amount of free space above the low disk threshold.

As a result of this processing, service 300 can prevent the amount of free space on disk 100 from falling below the low disk threshold to thereby ensure that sufficient space will exist for the installation of an update. By offloading applications based on utilization, service 300 can minimize the impact of this offloading on the end user. Notably, by offloading the install location folder as opposed to uninstalling the application, the application's registry entries and other information needed for proper execution of the application will remain on thin client 202. Such information typically requires negligible space on disk 100 but maintaining it allows the offloaded application to be restored seamlessly.

After an application has been offloaded, if the user selects a shortcut (or attempts to open a file) for the offloaded application, service 300 will be invoked and provided with the information for retrieving the offloaded application (i.e., the information for retrieving the install location folder from remote repository 350a). Service 300 may then verify that sufficient free space exists for downloading the offloaded application. This can be accomplished by retrieving the size of the offloaded application from application table 301a and determining whether adding this size to disk 100 will cause the amount of free space to fall below the low disk threshold. If there is sufficient free space, and in some embodiments, if the user provides confirmation, service 300 can then retrieve file 500a (e.g., by employing the credentials defined in configuration files 301) and restore install path folder 500 on disk 100 (e.g., using the value of the corresponding InstallLocation field in application table 301a). In embodiments that employ write filter 110, restoring folder 500 can include committing the folder from the overlay to disk 100. Service 300 may also revert any shortcuts and default application settings so that the now-restored application will be invoked rather than service 300.

In some embodiments, service 300 may employ a similar process to offload data files. However, rather than selecting data files to offload based on usage, service 300 can select data files based on the date of last modification. As mentioned above, the administrator can identify data folders that service 300 should consider when identifying data files as candidates for offloading. As represented in FIG. 6, service 300 can monitor these folders, which would be defined in configuration files 301, to create/maintain a file table 301c. File table 301c can be similar to application table 301a except that entries in file table 301c can identify the LastModifiedDate and Location of the file rather than the UsageTime and InstallLocation of the application. Service 300 could be configured to update file table 301c at periodic intervals, in response to the free space on disk 100 falling below the low disk threshold or at any other time. These updates would include assigning a rank to each entry that is based on the LastModifiedDate and possibly the Size of the file.

When the amount of free space falls below the low disk threshold, service 300 can employ file table 301c in much the same manner as application table 301a to identify and offload files. In particular, service 300 can identify the entry in file table 301c having the highest rank, retrieve a copy of the file and cause the copy to be stored on remote repository 350a. Service 300 can also delete the file from disk 100 including committing the delete when write filter 110 is employed. Service 300 may also create a file shortcut to replace the deleted file where the file shortcut points to service 300 rather than the previously associated application. For example, if the deleted file is a .pdf file, service 300 can create a shortcut to the deleted file that will invoke service 300 rather than Acrobat Reader. As with the application shortcut, this file shortcut can specify the remote storage location where the file has been offloaded. If the user selects the file shortcut, service 300 can restore the file using the process described above.

In other embodiments, service 300 may offload data files that are associated with an application that has been selected for offloading. In such cases, service 300 may identify file types associated with the application to be offloaded and then identify any files matching the associated file type(s) that are stored in any data folder identified in configuration file 301. Service 300 may then offload these data files based on the assumption that they will not be accessed unless the user again uses the associated application. In some embodiments, service 300 may also employ the last modified date to identify a subset of the files matching the associated file type(s) for offloading. For example, service 300 may only offload data files that have a last modified date that is older than a specified date.

In the description above, it has been assumed that remote repository 350a will maintain a separate folder (or storage location) for each client that may offload applications and/or data files. However, in some embodiments, remote repository 350a can be configured to maintain a common folder (or storage location) where a single copy of an offloaded application may be stored even when multiple clients have offloaded the application.

For example, in embodiments that employ remote service 350, when service 300 sends a copy of the install location folder for an application, it may identify the application and its version. Remote service 350 could then determine whether the install location folder for the same version of the application has already been stored in the common folder. If so, remote service 350 may simply notify service 300 that the install location folder has been stored. Similarly, whenever service 300 executing on any thin client 202 requests the install location folder for a particular version of the application, remote service 350 can send a copy of the single install location folder that has been stored.

In embodiments where service 300 can access remote repository 350a directly, service 300 can be configured to store the install location folder of an offloaded application in a common folder on remote repository 350a. This common folder could be specified in configuration files 301. For example, the administrator could define a common folder for the remote storage location to be used by service 300 on a group of thin clients 202 that have a common configuration (i.e., that run a common set of local applications).

In this way, only one copy of an offloaded application needs to be maintained for all thin clients that have the same version of the offloaded application. Given that many thin clients 202 in an enterprise environment may use the same version of an application, this technique can greatly reduce the amount of space that is required on remote repository 350a to offload applications.

Figure 7:
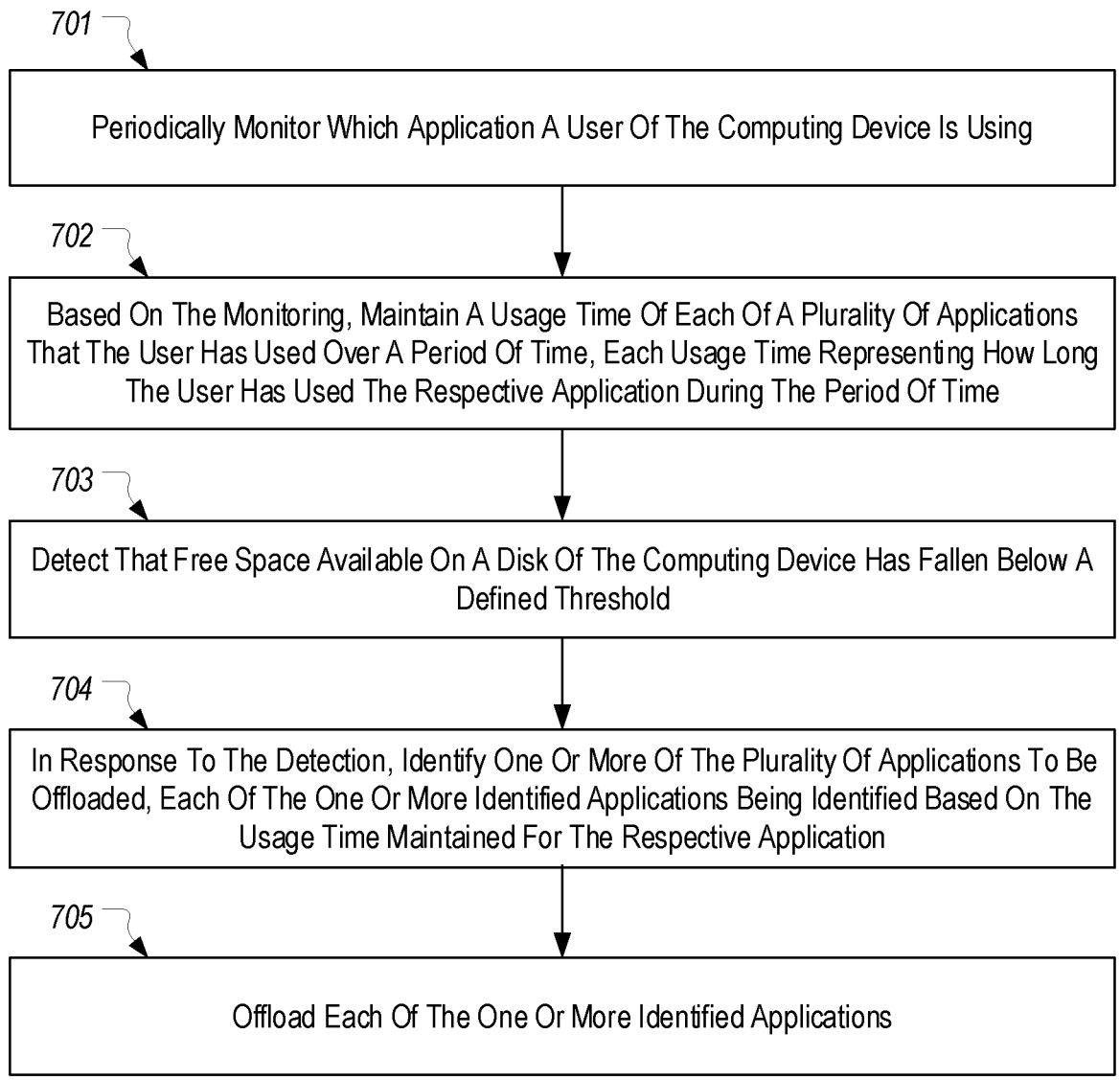
FIG. 7 illustrates a flow chart of an example method for selectively offloading applications.

FIG. 7 illustrates a flow chart of an example method 700 for selectively offloading applications. Method 700 can be performed on a computing device, such as a thin client 202, by offloading and monitoring service 300.

Method 700 includes an act 701 of periodically monitoring which application a user of the computing device is using. For example, service 300 can periodically detect which window has focus and identify which application owns the window.

Method 700 includes an act 702 of, based on the monitoring, maintaining a usage time of each of a plurality of applications that the user has used over a period of time, each usage time representing how long the user has used the respective application during the period of time. For example, service 300 can maintain and update active duration list 301b and/or application table 301a.

Method 700 includes an act 703 of detecting that free space available on a disk of the computing device has fallen below a defined threshold. For example, service 300 can query the operating system to identify the current amount of free space on disk 100 and compare it to an administrator-defined low disk threshold in configuration files 301.

Method 700 includes an act 704 of, in response to the detection, identifying one or more of the plurality of applications to be offloaded, each of the one or more identified applications being identified based on the usage time maintained for the respective application. For example, service 300 can access application table 301a to identify one or more applications with the highest assigned rank.

Method 700 includes an act 705 of offloading each of the one or more identified applications. For example, service 300 can copy the install location folder for each identified application to remote repository 350a and then delete each install location folder from disk 100.

In summary, the periodic monitoring that service 300 performs allows it to selectively offload applications that are used the least when disk 100 is running out of space. This selective and automatic offloading process ensures that disk 100 will retain sufficient free space to install updates. The present invention therefore minimizes the administrative burden of installing updates, particularly in enterprise environments that employ thin clients.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a service that executes on a computing device that includes a write filter, for selectively offloading applications from the computing device, the method comprising:
   periodically monitoring which application a user of the computing device is using by determining which application has focus on the computing device;
   based on the monitoring, maintaining a usage time of each of a plurality of applications that the user has used over a period of time, each usage time representing how long the user has used the respective application during the period of time by defining how long the respective application has had focus on the computing device during the period of time;
   detecting that free space available on a disk of the computing device has fallen below a defined threshold;
   in response to the detection, using the usage time and a size for each of the plurality of applications to assign a rank to the respective application;
   identifying one or more of the plurality of applications to be offloaded, each of the one or more identified applications being identified based on the rank assigned to the respective application; and
   offloading each of the one or more identified applications by:
   causing a copy of an install location folder for the respective identified application to be copied to a remote repository;
   deleting the install location folder for the respective identified application from the computing device; and
   causing the write filter to commit the delete of the install location folder for the respective application to thereby cause the install location folder to be deleted from the disk.

2. The method of claim 1, wherein the plurality of applications are defined as non-critical applications such that only non-critical applications are identified to be offloaded.

3. The method of claim 1, wherein identifying the one or more of the plurality of applications to be offloaded comprises determining that the rank assigned to each of the one or more applications is higher than the rank assigned to other applications of the plurality of applications.

4. The method of claim 1, wherein the rank is assigned to the respective application periodically.

5. The method of claim 1, wherein the remote repository is identified in configuration files stored on the computing device.

6. The method of claim 1, wherein the computing device is a thin client.

7. The method of claim 1, further comprising:
   in response to the detection, identifying one or more data files to be offloaded; and
   offloading each of the one or more identified data files.

8. The method of claim 1, further comprising:
   restoring a first application of the one or more offloaded applications in response to the user selecting the first application.

9. One or more computer storage media storing computer executable instructions which when executed by one or more processors of a computing device that includes a write filter implement a method for selectively offloading applications from the computing device, the method comprising:
   periodically monitoring which application a user of the computing device is using by determining which application has focus on the computing device;
   based on the monitoring, maintaining a usage time of each of a plurality of non-critical applications that the user has used over a period of time, each usage time representing how long the user has used the respective non-critical application during the period of time by defining how long the respective non-critical application has had focus on the computing device during the period of time;
   assigning a rank to each of the plurality of non-critical applications based on the usage time and a size of the respective non-critical application;
   detecting that free space available on a disk of the computing device has fallen below a defined threshold;
   in response to the detection, identifying a first application of the plurality of non-critical applications that has been assigned a highest rank; and
   offloading the first application by causing a copy of an install location folder of the first application to be stored in a remote repository, deleting the install location folder of the first application from the computing device, and causing the write filter to delete the install location folder of the first application from the disk.

10. The computer storage media of claim 9, wherein the first application has the lowest usage time.

11. The computer storage media of claim 9, wherein the method further comprises:
    restoring the first application by causing the copy of the install location folder of the first application to be stored on the disk.

12. The computer storage media of claim 11, wherein restoring the first application comprises:
    receiving input from the user that requests that the first application be executed; and
    determining that the copy of the install location folder of the first application can be stored on the disk without causing the free space available on the disk to fall below the defined threshold.

13. A method, performed by a service that executes on a thin client that includes a write filter, for selectively offloading applications from the thin client, the method comprising:
    periodically monitoring which application a user of the thin client is using by determining which application has focus on the computing device;
    based on the monitoring, maintaining a usage time of each of a plurality of applications that the user has used over a period of time, each usage time representing how long the user has used the respective application during the period of time by defining how long the respective application has had focus on the computing device during the period of time;
    detecting that free space available on a disk of the thin client has fallen below a defined threshold;

in response to the detection, using the usage time and a size for each of the plurality of applications to assign a rank to the respective application;

identifying one or more of the plurality of applications to be offloaded, each of the one or more identified applications being identified based on the rank assigned to the respective application, each of the one or more identified applications comprising a non-critical application; and offloading each of the one or more identified applications by:
    causing a copy of an install location folder for the respective application to be stored on a remote repository;
    deleting the install location folder for the respective application; and
    invoking commit functionality of the write filter to cause the install location folder for the respective application to be deleted from the disk.

14. The method of claim 13, wherein the rank is assigned to the respective application periodically.

15. The method of claim 13, further comprising:
in response to the detection, identifying one or more data files to be offloaded; and
offloading each of the one or more identified data files.

16. The method of claim 13, wherein the usage time for each of the plurality of applications is a sum of a duration of each monitoring period during which the respective application has focus during the period of time.

* * * * *